(12) United States Patent
Shibata

(10) Patent No.: US 8,442,366 B2
(45) Date of Patent: May 14, 2013

(54) OPTICAL WAVEGUIDE FOR TOUCH PANEL AND TOUCH PANEL USING THE SAME

(75) Inventor: Naoki Shibata, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/337,385

(22) Filed: Dec. 27, 2011

(65) Prior Publication Data
US 2012/0177320 A1 Jul. 12, 2012

(30) Foreign Application Priority Data

Jan. 12, 2011 (JP) ................... 2011-004308
Sep. 22, 2011 (JP) ................... 2011-207294

(51) Int. Cl.
*G02B 6/32* (2006.01)
*G02B 6/10* (2006.01)
*G06F 3/042* (2006.01)

(52) U.S. Cl.
USPC ............... 385/33; 385/43; 385/131; 345/175; 345/176

(58) Field of Classification Search ............ 385/33, 385/43, 129–132; 345/173, 175, 176
See application file for complete search history.

(56) References Cited

U.S. PATENT DOCUMENTS

| | | | | |
|---|---|---|---|---|
| 7,218,812 B2 * | 5/2007 | Maxwell et al. | ................. | 385/33 |
| 7,520,050 B2 * | 4/2009 | Graham | ................... | 29/825 |
| 7,826,699 B2 * | 11/2010 | Juni | ......................... | 385/33 |
| 2004/0201579 A1 | 10/2004 | Graham | | |
| 2009/0102815 A1 | 4/2009 | Juni | | |

FOREIGN PATENT DOCUMENTS

JP 2009-103902 A 5/2009

* cited by examiner

*Primary Examiner* — Daniel Petkovsek
(74) *Attorney, Agent, or Firm* — Westerman, Hattori, Daniels & Adrian, LLP

(57) ABSTRACT

Provided are an optical waveguide for a touch panel which has high light-gathering power on a light-emitting side and which may materialize a touch panel having excellent position detection performance, and a touch panel using the optical waveguide. The optical waveguide for a touch panel includes: cores; and an over cladding layer covers the cores, the cores including light-emitting cores each formed as a lens portion having a shape in plan view including a tapered portion whose width gradually increases toward an end surface on the light-emitting side and an elliptical arc portion which bulges outwardly a tip side of the tapered portion having the gradually-increasing width so as to be in a shape of an elliptical arc, the elliptical arc portion having a major axis direction aligned in a longitudinal direction of the tapered portion.

8 Claims, 6 Drawing Sheets

OPTICAL WAVEGUIDE FOR TOUCH PANEL AND TOUCH PANEL USING THE SAME

BACKGROUND OF THE INVENTION

1. Field of the Invention

The present invention relates to an optical waveguide for a touch panel and a touch panel using the same.

2. Description of the Related Art

Touch panels are input devices for operating an apparatus by directly touching a display screen of a liquid crystal display device or the like with a finger, a purpose-built stylus, or the like, and include a display which displays operation details and the like, and detection means for detecting the position (coordinates) of a portion of the display screen of the display touched with the finger or the like. Information about the touch position detected by the detection means is sent in the form of a signal to the apparatus, which in turn performs an operation and the like displayed on the touch position of the display screen. Examples of the apparatus employing such a touch panel include ATMs in banking facilities, ticket vending machines in stations, portable game machines, and the like.

Detection means employing an optical waveguide is proposed as the detection means for detecting the finger touch position and the like on the above-mentioned touch panel (see, for example, U.S. Patent Application Publication No. 2004/0201579A1). Specifically, the touch panel includes optical waveguides provided around a periphery of a display screen of a rectangular display, and is configured to emit multiple light beams parallel to the display screen of the display from an optical waveguide provided on one side portion of the display screen toward the other side portion, and to cause the light beams to enter an optical waveguide provided on the other side portion. These optical waveguides cause the light beams to travel in a lattice form on the display screen of the display. When a portion of the display screen of the display is touched with a finger in this state, the finger blocks some of the light beams. Therefore, the light-receiving optical waveguide senses a light blocked portion, and the position of the portion touched with the finger is thus detected.

By the way, the light beams emitted from an end surface of an optical waveguide directly into the air diverge radially unless the measures are taken. Therefore, there have been proposed various kinds of optical waveguides, which include a core having an end portion formed in a lens-shaped configuration so as to suppress the divergence of the emitted light beams and emit light beam which are collimated as much as possible. An optical waveguide in which the end portion of the core is formed as a lens portion of a special configuration in plan view is known (see JP-A-2009-103902).

In the technology disclosed in JP-A-2009-103902 described above, the lens portion at the end portion of the core of the optical waveguide is of a special configuration in plan view including a tapered portion and an arc portion. By the configuration, divergence of the light beams from a starting point of the lens may be suppressed by the tapered portion, and the light beams may be refracted at the arc portion to bring the light beams into nearly collimated light beams.

However, in a touch panel, the position of a finger which touches the display screen of the display is required to be detected with higher accuracy. In order to respond to the requirement, it is necessary to further enhance the power of gathering light emitted from the end portion of the core.

SUMMARY OF THE INVENTION

An optical waveguide is provided for a touch panel which has high light-gathering power on a light-emitting side and which may materialize a touch panel having excellent position detection performance. A touch panel using the optical waveguide is also provided.

A first aspect is intended for an optical waveguide for a touch panel, including: cores; and an over cladding layer formed so as to cover the cores, the optical waveguide being provided along a periphery of a display screen of a display of the touch panel, the cores including light-emitting cores each having an end portion positioned in a first side portion of the display screen of the display, each of the end portions of the light-emitting cores being formed as a lens portion, the lens portion having a shape in plan view including a tapered portion whose width gradually increases toward an end surface on the light-emitting side and an elliptical arc portion which is formed by bulging outwardly a tip side of the tapered portion having the gradually-increasing width so as to be in a shape of an elliptical arc, the elliptical arc portion having a major axis direction aligned in a longitudinal direction of the tapered portion, in which a longitudinal length (L) of the lens portion, a taper angle ($\alpha$) of the tapered portion, and a major axis radius (a) of an ellipse constituting part of the elliptical arc portion satisfy one of the following conditions (1) and (2).

[Equation 1]

When $L/a < 3, 4° \leq \alpha \leq 20°$  (1)

(where L and a are in µm, $\alpha$ is in ° (degrees), and the same is applied to the following)

When $L/a \geq 3, 4° \leq \alpha \leq 10°$  (2)

Further, in particular in the first aspect, a second aspect is intended for an optical waveguide for a touch panel, in which the longitudinal length (L) of the lens portion and the major axis radius (a) and a minor axis radius (b) of the ellipse constituting part of the elliptical arc portion satisfy the following conditions (3) and (4) at the same time, and the taper angle ($\alpha$) of the tapered portion satisfies the following condition (5).

[Equation 2]

$$\sqrt{1 - \left(\frac{n_1}{n_2}\right)^2} = \frac{b}{a} \quad (3)$$

(where b is in µm, $n_1$ is a refractive index of the over cladding layer, and $n_2$ is a refractive index of the cores, and the same is applied to the following)

$$1 + \frac{n_1}{n_2} = \frac{L}{a} \quad (4)$$

$$4° \leq \alpha \leq 20° \quad (5)$$

Further, in particular in the first and second aspects, a third aspect is intended for an optical waveguide for a touch panel, in which: an end portion on the light-emitting side of the over cladding layer which covers the lens portion of each of the cores is formed as a second lens portion; an end surface on the light-emitting side of the second lens portion is formed as a substantially quadrantal curved surface in side view which bulges outwardly; and a distance ($L_2$) between a tip of an elliptical arc curved surface in plan view of the elliptical arc portion of the lens portion of each of the cores and a center of curvature of the substantially quadrantal curved surface in side view of the second lens portion, and a radius of curvature ($R_2$) of the substantially quadrantal curved surface in side view satisfy the following condition (6).

[Equation 3]

$$(L_2/2)-0.3 < R_2 < (L_2/2)+0.3 \quad (6)$$

(where $L_2$ and $R_2$ are in μm)

Further, a fourth aspect is intended for a touch panel, including: the optical waveguide for a touch panel according to any one of the first to third aspects of the present invention, in which: the optical waveguide is provided along the periphery of the display screen of the display of the touch panel; an end portion of each of the light-emitting cores is positioned in a first side portion of the display screen of the display; and an end portion of each of the cores which receive the emitted light beams is positioned in a second side portion of the display screen of the display.

By configuring the lens portion in plan view so as to be tapered so that the width thereof gradually increases toward the end surface on the light-emitting side and so that a tip side of the tapered portion having the gradually-increasing width is in the shape of the elliptical arc which bulges outwardly, and setting the longitudinal length (L) and the taper angle (α) of the lens portion and the major axis radius (a) of the ellipse constituting part of the elliptical arc portion so as to satisfy one of the above-mentioned conditions (1) and (2), a divergent angle of light beams which reach an entrance of the lens portion may be effectively reduced at the tapered portion, and in this state, more collimated light beams may be emitted from the elliptical arc portion.

In the optical waveguide for a touch panel according to each of the first to third aspects, each of the end portions of the light-emitting cores is formed as the lens portion having the above-mentioned specific configuration and specific dimensions, and thus the divergence of light beams emitted from the end portion of the core is significantly suppressed by refraction through the lens portion to collimate the light beams. Therefore, the optical waveguide for a touch panel has high light-gathering power on the light-emitting side and may transmit light beams with high accuracy in a very limited region.

Further, according to the touch panel obtained using the optical waveguide for a touch panel, because the power of gathering light emitted from the end portion of the core of the optical waveguide is high and light beams may be transmitted with high accuracy in a very limited region, it is possible to detect, when a finger touches the display screen of the display, the position of the portion where the finger touches with accuracy.

DETAILED DESCRIPTION OF THE INVENTION

Preferred embodiments according to the present invention are now described in detail with reference to the drawings.

Figure 1:
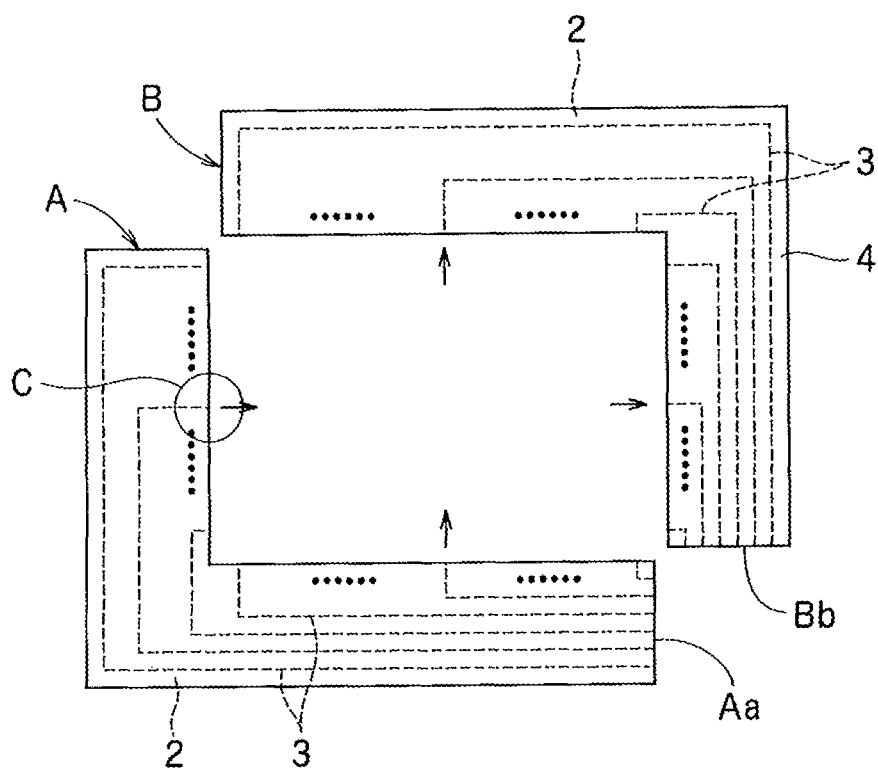
FIG. 1 is a schematic plan view illustrating an optical waveguide for a touch panel according to a first preferred embodiment.

FIG. 1 illustrates a plan view of an optical waveguide for a touch panel according to an embodiment. The optical waveguide for a touch panel includes two L-shaped optical waveguides A and B. Of the two, the L-shaped optical waveguide A is a light-emitting optical waveguide (see arrows of FIG. 1), and the L-shaped optical waveguide B is a light-receiving optical waveguide (see arrows of FIG. 1). Each of the two L-shaped optical waveguides A and B includes an under cladding layer (body) 2 formed in an L-shaped configuration, and a plurality of cores 3 serving as a passageway for light and formed on predetermined portions of the surface of the under cladding layer 2, the plurality of cores 3 being patterned to extend from first end edges Aa and Pb of the above-mentioned L-shaped configuration to inner end edge portions of the L-shaped configuration (on the display screen side of a display 11 (see FIG. 4)) and to be arranged in parallel at equal intervals. In FIG. 1, the cores 3 are indicated by broken lines, and the thickness of the broken lines indicates the thickness of the cores 3. Further, the number of the cores 3 is shown as abbreviated by using dots.

An over cladding layer 4 is formed on the surface of the under cladding layer 2 so as to cover the cores 3. The number of the cores 3 formed in the L-shaped optical waveguide A on the light-emitting side is equal to the number of the cores 3 formed in the L-shaped optical waveguide B on the light-receiving side. An end portion of each of the cores 3 which is located in the inner end edge portion of the above-mentioned L-shaped configuration is formed as a lens portion 30 in a special shape in plan view as illustrated in FIG. 2A, which is an enlarged view of a portion C circled in FIG. 1.

Figure 2A:
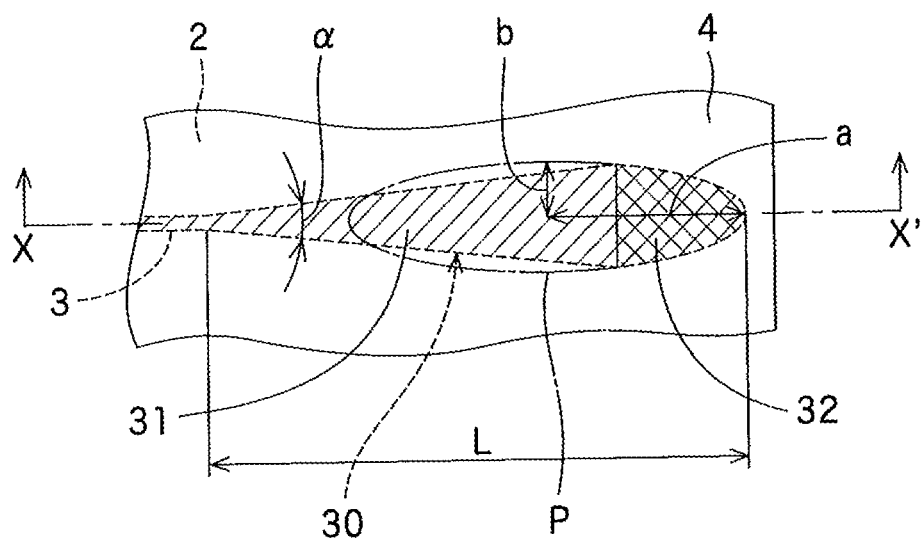
FIG. 2A is an enlarged plan view illustrating a configuration of an end surface of a core in the optical waveguide for a touch panel.
Figure 2B:
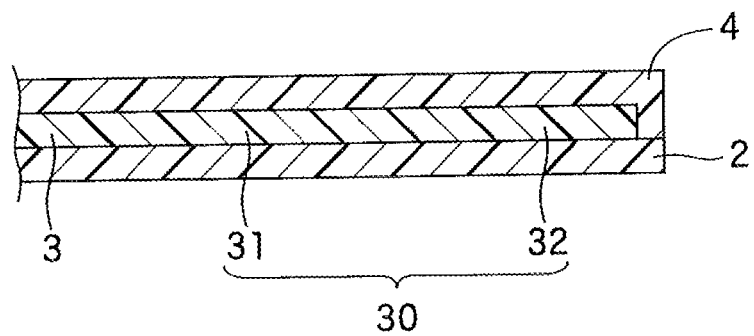
FIG. 2B is an enlarged sectional view taken along the line X-X' of FIG. 2A.

As illustrated in FIG. 2B, which is a sectional view taken along the line X-X' of FIG. 2A, the lens portion 30 is of a flat shape with a thickness similar to that of the remaining portions of the core 3, and is sandwiched between the under cladding layer 2 and the over cladding layer 4 in a layered manner.

The lens portion 30 (referring back to FIG. 2A) has a configuration in plan view, which is a combination of a tapered portion 31 (hatched portion in FIG. 2A) whose width gradually increases toward the end surface on the light-emitting side, and an elliptical arc portion 32 (portion in a checkered diagonal pattern in FIG. 2A) which is formed by bulging outwardly the tip side of the tapered portion 31 having the gradually-increasing width so as to be in the shape of an elliptical arc. Note that, the major axis direction of the elliptical arc portion 32 is aligned with the longitudinal direction of the tapered portion 31.

A longitudinal length (L) of the lens portion 30, a taper angle (α) of the tapered portion 31, and a major axis radius (a) of the ellipse constituting part of the elliptical arc portion 32

(dot-and-dash line P in FIG. 2A) are set to satisfy one of the following conditions (1) and (2).

[Equation 4]

When $L/a<3, 4°\leq\alpha\leq20°$ (1)

When $L/a\geq3, 4°\leq\alpha\leq10°$ (2)

Figure 3:
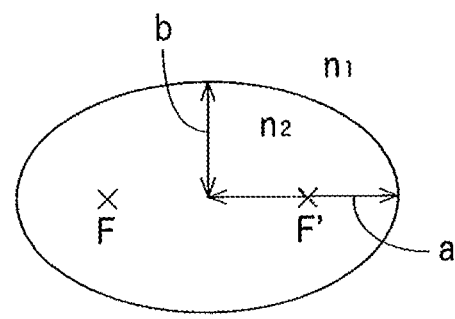
FIG. 3 is an explanatory view of a configuration of a lens portion at the end surface of the core.

In an elliptical lens holding the following expression (β) (see FIG. 3, where F and F' are the foci, a is the major axis radius, and b is the minor axis radius), when a point light source is placed on the focus F which is the focus farther from the light-emitting side, light beams emitted therefrom are collimated.

[Equation 5]

$$\sqrt{1-\left(\frac{b}{a}\right)^2} = \frac{m_1}{m_2} \quad (\beta)$$

(where $m_1$ is the refractive index outside the lens and $m_2$ is the refractive index inside the lens)

The lens portion 30 at the end portion of the core 3 from which light beams are emitted is also desired to be in the shape of an elliptical arc according to the above-mentioned expression (β). However, in the case of an optical waveguide, the waveguide which transmits light beams to the lens portion 30 usually has a width of about 15 to 50 μm, and light beams emitted from a position which deviates from the focus F do not have the above-mentioned characteristics, and thus do not become collimated. This tendency is largely affected by the width of the entrance portion of the lens portion 30 as the size of the entire lens portion 30 becomes smaller, and is relatively less affected by the width of the entrance portion of the lens portion 30 as the size of the lens portion 30 becomes larger. Therefore, by limiting the taper angle (α) of the tapered portion 31 in the lens portion 30 and reducing the divergent angle of the light beams, the passageway of the light beams is limited as if the light beams were emitted from a point light source, and, by providing the specific elliptical arc portion 32 on the tip side thereof, the light-gathering power is enhanced. Note that, the specific values in the respective conditions (1) and (2) were determined experimentally.

When the longitudinal length (L) of the lens portion 30 and the major axis radius (a) and the minor axis radius (b) of the ellipse constituting part of the elliptical arc portion satisfy the following conditions (3) and (4) at the same time and when the taper angle (α) of the tapered portion satisfies the following condition (5), the light-gathering power of the optical waveguide is particularly excellent. Thus, this configuration is suitably applied as an optical waveguide for a touch panel having a display screen size of 15 inch or larger which is required to have high resolution and as an optical waveguide for a touch panel which requires input with a stylus.

[Equation 6]

$$\sqrt{1-\left(\frac{n_1}{n_2}\right)^2} = \frac{b}{a} \quad (3)$$

$$1 + \frac{n_1}{n_2} = \frac{L}{a} \quad (4)$$

$$4° \leq \alpha \leq 20° \quad (5)$$

The above-mentioned way of thinking may be similarly applied to the case where the traveling direction of the light beams is opposite. Thus, in this embodiment, the lens portion 30 in the special shape in plan view is also formed at an end surface of each of the cores 3 on the light-receiving side, similarly to that in the cores 3 on the light-emitting side (illustration omitted).

Therefore, in the optical waveguide including the lens portions 30 in the special shape in plan view both on the light-emitting side and on the light-receiving side, divergence of light beams emitted from the end portions of the cores 3 is significantly suppressed by refraction through the lens portions 30, to thereby collimate the light beams, and, on the other hand, light beams received from the end portions of the cores 3 are further gathered by refraction through the lens portions 30. Thus, light beams may be transmitted with high accuracy in a very limited region.

Figure 4:
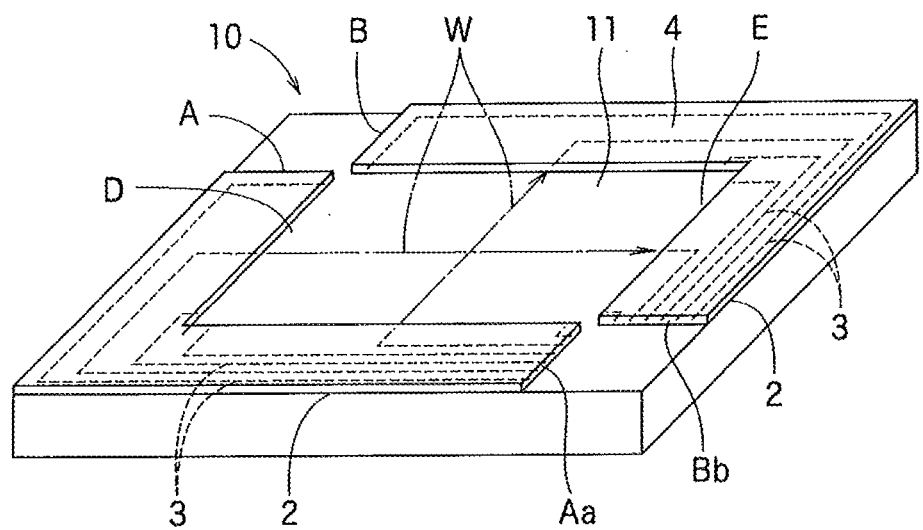
FIG. 4 is a perspective view schematically illustrating a touch panel using the optical waveguide for a touch panel.

The special optical waveguides A and B are provided along the periphery of a display screen of the rectangular display 11 of a touch panel 10 so as to surround the display screen as illustrated in FIG. 4, for example. A light source (not shown) is connected to the cores 3 on the first end edge Aa of the L-shaped optical waveguide A which emits light beams W, and a detector (not shown) is connected to the cores 3 on the first end edge Bb of the L-shaped optical waveguide B which receives the light beams W. More specifically, in conditions as illustrated in FIG. 4, the end portions (lens portion 30 illustrated in FIG. 2A) of the cores 3 which emit the light beams W are positioned in an I-shaped portion (first side portion) D along the periphery of the display screen of the display 11, and the end portions of the cores 3 which receive the light beams W are positioned in an L-shaped portion (second side portion) E along the periphery of the display screen of the display 11, the L-shaped portion E being opposed to the above-mentioned L-shaped portion D. The end surfaces of the cores 3 which emit the light beams W, that is, the curved bulging surfaces of the elliptical arc portions 32 of the lens portions 30 are in face-to-face relationship with the end surfaces of the cores 3 which receive the light beams W (curved bulging surfaces of the elliptical arc portions 32 of the lens portions 30 similarly to those on the light-emitting side). In FIG. 4, the cores 3 are indicated by broken lines, the thickness of the broken lines indicates the thickness of the cores 3, and the number of the cores 3 is shown as abbreviated. Further, for the sake of easy understanding, only the light beams W are illustrated that are only a part of multiple light beams which are emitted from the cores 3 and which are received by the corresponding opposing cores 3.

Such optical transmission is performed between the two L-shaped optical waveguides A and B illustrated in FIG. 4, and hence the two L-shaped optical waveguides A and B described above cause the light beams W to travel in a lattice form on the display screen of the display 11 of the touch panel 10 as illustrated in the figure while the horizontal divergence of the light beams W is suppressed. Thus, when the display screen of the display 11 is touched with a finger in this state, the position of a portion touched with the finger is precisely detected because of the above-mentioned high light-gathering power for the emitted light beams and the incident light beams.

The dimensions and the like of the above-mentioned L-shaped optical waveguides A and B may be determined to conform to the size of the display 11 of the touch panel 10. For example, the lengths of two elongated portions of the L-shaped optical waveguides A and B are on the order of 30 to 300 mm, and the widths of the two elongated portions thereof are on the order of 50 μm to 2 mm. The number of light-emitting (light-receiving) cores 3 may be determined according to the number of operation details to be displayed on the display screen of the display 11, and is, for example, on the order of 20 to 300.

Next, an exemplary manufacturing method of such an optical waveguide for a touch panel is described. FIGS. 5A to 5D to which reference is made in this description illustrate the manufacturing method mainly about the lens portion 30 illustrated in FIGS. 2A and 2B and a peripheral portion thereof.

First, a base 1 of a flat shape (see FIG. 5A) for use in the manufacture of the above-mentioned optical waveguides A and B for a touch panel (see FIG. 1) is prepared. Examples of a material for the formation of the base 1 include glass, quartz, silicon, resins, metals and the like. The thickness of the base 1 is, for example, in the range of 20 μm (for a film-like base 1) to 5 mm (for a plate-like base 1).

Figure 5A:
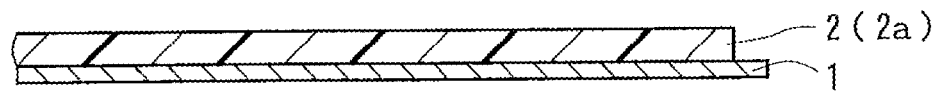
FIGS. 5A to 5D are explanatory views schematically illustrating steps of forming an over cladding layer in a method of manufacturing the optical waveguide for a touch panel.

Next, as illustrated in FIG. 5A, a varnish prepared by dissolving a photosensitive resin in a solvent, which serves as a material for the formation of the under cladding layer 2, is applied to a predetermined region on the above-mentioned base 1. The application of the varnish is achieved, for example, by a spin coating method, a dipping method, a casting method, an injection method, an ink jet method and the like. Then, the varnish is dried by a heating treatment at 50° C. to 120° C. for 10 to 30 minutes. This provides a photosensitive resin layer 2a which is to be formed into the under cladding layer 2.

Next, the above-mentioned photosensitive resin layer 2a is exposed to irradiation light. Examples of the irradiation light for the above-mentioned exposure used herein include visible light, ultraviolet light, infrared light, X-rays, α-rays, β-rays, γ-rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10,000 mJ/cm$^2$, preferably 50 to 3,000 mJ/cm$^2$.

After the above-mentioned exposure, a heating treatment is performed to complete a photo reaction. This heating treatment is performed at 80° C. to 250° C., preferably at 100° C. to 200° C., for 10 seconds to 2 hours, preferably for 5 minutes to 1 hour. This forms the above-mentioned photosensitive resin layer 2a into the under cladding layer 2. The thickness of the under cladding layer 2 (photosensitive resin layer 2a) is typically in the range of 1 to 50 μm, preferably in the range of 5 to 30 μm.

Figure 5B:
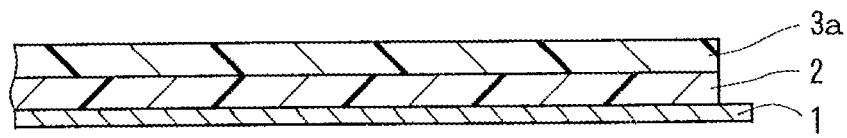

Next, as illustrated in FIG. 5B, a photosensitive resin layer 3a which is to be formed into the cores 3 is formed on the surface of the above-mentioned under cladding layer 2. The formation of this photosensitive resin layer 3a is carried out in a manner similarly to the method for the formation of the photosensitive resin layer 2a formed into the under cladding layer 2 described with reference to FIG. 5A. The material for the formation of the cores 3 used herein is a material such that the obtained cores 3 have a refractive index greater than that of the materials for the formation of the above-mentioned under cladding layer 2 and the over cladding layer 4 (see FIG. 5D) to be described later. The adjustment of this refractive index may be made, for example, by adjusting the selection of the types of the materials for the formation of the above-mentioned under cladding layer 2, the cores 3, and the over cladding layer 4 and the composition ratio thereof.

In this connection, it is preferred that the refractive index of the above-mentioned under cladding layer 2 and the over cladding layer 4 to be described later (refractive index at a wavelength of 850 nm; the same is applied to the following) be adjusted to 1.45 to 1.55, and that the refractive index of the cores 3 be greater than that of the under cladding layer 2 and the over cladding layer 4 and be adjusted to 1.50 to 1.60.

Next, an exposure mask having an opening pattern formed therein corresponding to the pattern of the cores 3 (including the lens portion 30) is placed over the above-mentioned photosensitive resin layer 3a. Then, the above-mentioned photosensitive resin layer 3a is exposed to irradiation light through the exposure mask. After that, a heating treatment is performed. The exposure and the heating treatment are carried out in a manner similarly to the method for the formation of the under cladding layer 2 described with reference to FIG. 5A.

Figure 5C:
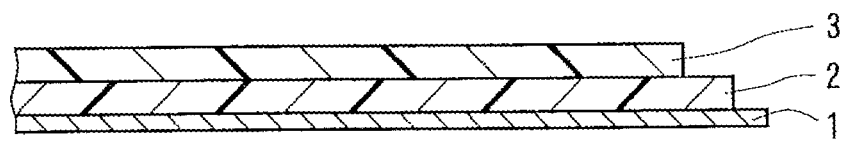

Subsequently, development is performed using a developing solution to dissolve away an unexposed portion of the above-mentioned photosensitive resin layer 3a (see FIG. 5B), thereby forming the photosensitive resin layer 3a remaining on the under cladding layer 2 into the pattern of the cores 3, as illustrated in FIG. 5C. In this process, the first end portion of each of the cores 3 is in the form of the lens portion 30. The above-mentioned development employs, for example, an immersion method, a spray method, a puddle method, and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution in the remaining photosensitive resin layer 3a formed in the pattern of the cores 3 is removed by a heating treatment. This heating treatment is typically performed at 80° C. to 120° C. for 10 to 30 minutes. Thus, the remaining photosensitive resin layer 3a formed in the pattern of the cores 3 is formed into the cores 3. The thickness of the cores 3 (photosensitive resin layer 3a) is typically in the range of 20 to 150 μm, preferably in the range of 40 to 100 μm. The width of the cores 3 (width except for the portion in which the lens portion 30 is formed) is typically in the range of 8 to 50 μm, preferably in the range of 10 to 25 μm.

Figure 5D:
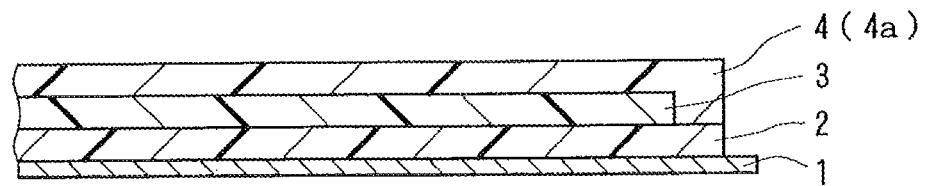

Then, as illustrated in FIG. 5D, a photosensitive resin layer 4a which is to be the over cladding layer 4 is formed on the surface of the above-mentioned under cladding layer 2 so as to cover the above-mentioned cores 3. The formation of this photosensitive resin layer 4a is carried out in a manner similarly to the method for the formation of the photosensitive resin layer 2a formed into the under cladding layer 2 described with reference to FIG. 5A. After that, the exposure and the heating treatment are carried out in a manner similarly to the method for the formation of the under cladding layer 2 to form the over cladding layer 4. The thickness of the over cladding layer 4 (photosensitive resin layer 4a) (thickness as measured from the surface of the cores 3) is typically in the range of 100 to 1,000 μm, preferably in the range of 200 to 600 μm.

Subsequently, the base 1 is removed from the under cladding layer 2. An example of the method for the removal is as follows. A lower surface of the base 1 is brought into contact with an upper surface of a vacuum suction stage (not shown), and the base 1 is fixed thereon by air suction. Next, an upper surface of the over cladding layer 4 is caused to suck to a vacuum suction machine (not shown) under suction to lift a sucked portion thereof in this state. This removes the over cladding layer 4 from the base 1, with the cores 3 and the under cladding layer 2 bonded together. The adhesive force between the base 1 and the under cladding layer 2 is smaller than the adhesive forces between the over cladding layer 4 and the cores 3 and between the over cladding layer 4 and the under cladding layer 2 because of the materials thereof. Thus, the above-mentioned process easily removes the base 1 from the under cladding layer 2.

Then, portions which become the two L-shaped optical waveguides A and B described above are cut by punching using a blade and the like. This provides optical waveguides for a touch panel which include the two L-shaped optical waveguides A and B illustrated in FIG. 1.

In the above-mentioned preferred embodiment, the above-mentioned lens portions 30 in the special shape in plan view are provided at the end surfaces of both the cores 3 on the light-emitting side and the cores 3 on the light-receiving side, but it is enough that the special lens portions 30 are provided at the end surfaces of the cores at least on the light-emitting side. On the light-receiving side, a condenser lens or the like having different configurations may be combined.

Further, in the above-mentioned preferred embodiment, the lens portion 30 formed in the end portion of each of the cores 3 is positioned inside the over cladding layer 4. However, the tip portion or the whole of the lens portion 30 may be exposed without being covered with the over cladding layer 4.

Figure 6:
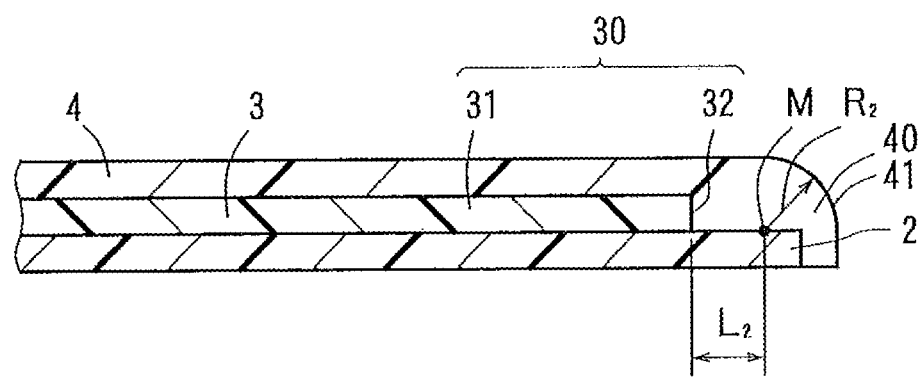
FIG. 6 is an enlarged sectional view schematically illustrating an end portion of a core of an optical waveguide for a touch panel according to a second preferred embodiment.

FIG. 6 illustrates an optical waveguide for a touch panel according to a second preferred embodiment. The optical waveguide for a touch panel according to the second preferred embodiment is such that a light-emitting end portion of the over cladding layer 4 which covers the lens portion 30 of each of the cores 3 in the first preferred embodiment is formed as a second lens portion 40. A light-emitting end surface of the second lens portion 40 is formed as a substantially quadrantal curved surface 41 in side view which bulges outwardly. The dimensions of the second lens portion 40 are set so that a distance ($L_2$) from the tip of the lens portion 30 (or the tip of the elliptical arc curved surface 32 in plan view of the elliptical arc portion) formed in the end portion of each of the cores 3 to the center M of curvature of the quadrantal curved surface 41 in side view and the radius ($R_2$) of curvature of the quadrantal curved surface 41 in side view satisfy the following condition (6). Except for this, the second preferred embodiment is similar to the first preferred embodiment. Like reference numerals and symbols are used in the second preferred embodiment to designate parts similar to those of the first preferred embodiment.

[Equation 7]

$$(L_2/2)-0.3<R_2<(L_2/2)+0.3 \quad (6)$$

(where $L_2$ and $R_2$ are in μm)

The light beams W emitted from the lens portion 30 formed in the end portion of each of the cores 3 (light beams W restrained from diverging horizontally) are restrained from diverging vertically (in a direction perpendicular to the longitudinal direction of the under cladding layer 2) by refraction through the above-mentioned second lens portion 40 formed in the end portion of the over cladding layer 4. When the light beams W are received, the light beams W are narrowed down and converged vertically by refraction through the second lens portion 40, and enter each of the cores 3 through the end surface (arcuately curved surface in plan view of the elliptical arc portion 32) of each of the cores 3 in that state (and the light beams W are narrowed down and converged horizontally at this time). This increases optical transmission efficiency to improve the precision of the finger detection in the touch panel 10 (see FIG. 2).

Figure 7:
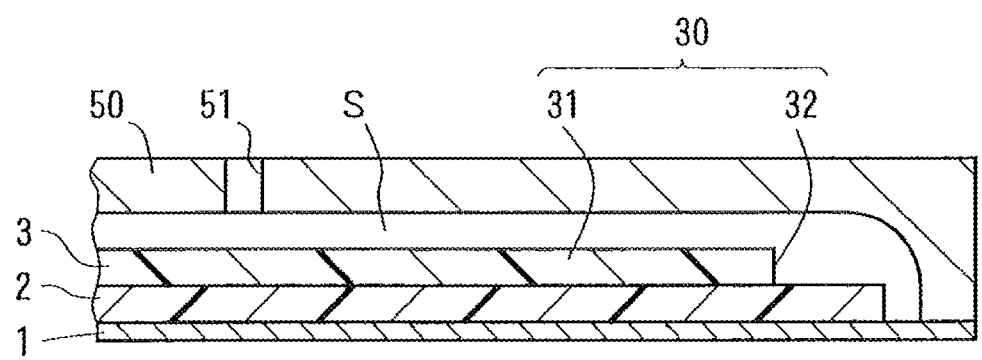
FIG. 7 is an explanatory view schematically illustrating the method of manufacturing the optical waveguide for a touch panel.

A manufacturing method for such an optical waveguide for a touch panel is as follows. The step of forming the cores 3 and its preceding steps are similar to those of the first preferred embodiment, as illustrated in FIGS. 5A to 5C. The subsequent step of forming the over cladding layer 4 is as follows. First, as illustrated in FIG. 7, a molding die 50 is used which is made of quartz (material permeable to irradiation light such as ultraviolet light) and which has a recessed portion formed therein having a die surface complementary in shape to the surface (including the second lens portion 40) of the over cladding layer 4 (see FIG. 6). An opening surface of the recessed portion is positioned in a predetermined position of the surface of the base 1, and the molding die 50 is brought into intimate contact with the surface of the base 1. Next, a photosensitive resin for the formation of the over cladding layer 4 is charged through an inlet 51 formed in the above-mentioned molding die 50 into a space (mold space S) surrounded by the die surface of the above-mentioned recessed portion and the surfaces of the base 1, the under cladding layer 2, and the cores 3. Exposure to irradiation light such as ultraviolet light is performed through the above-mentioned molding die 50 in a manner similarly to that in the first preferred embodiment. After the molding die 50 removed, a heating treatment or the like is performed to form the over cladding layer 4 (including the second lens portion 40) (see FIG. 6). The subsequent steps are performed in a manner similarly to that in the first preferred embodiment. Thus, the optical waveguide for the touch panel is manufactured.

In the above-mentioned preferred embodiments, the formation of the under cladding layer 2 and the over cladding layer 4 uses the photosensitive resin as the materials thereof, and is achieved by exposure and development. However, other materials and other methods may be used. As an example, the formation of the under cladding layer 2 and the over cladding layer 4 may use a thermosetting resin such as polyimide resin and epoxy resin as the materials thereof, and may be achieved by applying a varnish prepared by dissolving the thermosetting resin in a solvent and then performing a heating treatment (typically at 300° C. to 400° C. for 60 to 180 minutes) to set the varnish.

In the above-mentioned preferred embodiments, the photosensitive resin is used to form the under cladding layer 2, but other materials may be used. A resin film may be used as the under cladding layer 2. Alternatively, a substrate with a metal film or a metal thin film formed on the surface thereof may be used in place of the under cladding layer 2 so that the surface of the metal material functions as a surface for reflecting the light beams W propagating inside the cores 3.

In the above-mentioned preferred embodiments, the optical waveguide for a touch panel includes the two L-shaped optical waveguides A and B. However, the two L-shaped optical waveguides A and B may be integrated at their opposite ends together into a rectangular frame-shaped configuration. The manufacturing method therefor includes the step of cutting into the rectangular frame-shaped configuration in place of the step of cutting into two L-shaped configurations in the above-mentioned manufacturing method for the optical waveguide for a touch panel.

When a film-like base is used as the base 1 in the above-mentioned manufacturing method for the optical waveguide for a touch panel, the film-like base 1 may be removed from the under cladding layer 2 after the cutting into the above-mentioned L-shaped configurations together with the film-like base 1. Alternatively, the base 1 may be used together with the optical waveguide for a touch panel without being removed.

Next, inventive examples of the present invention are described in conjunction with comparative examples. Note that, the present invention is not limited to the inventive examples.

EXAMPLES

Examples 1 to 16 and Comparative Examples 1 to 9

Material for Formation of Under Cladding Layer and Over Cladding Layer

A material for formation of an under cladding layer and an over cladding layer was prepared by dissolving 75 parts by weight of an epoxy resin (EHPE3150 manufactured by Daicel Chemical Industries, Ltd.), 25 parts by weight of an epoxy resin (MARPROOF G-0150M manufactured by NOF CORPORATION), and 4 parts by weight of a photoacid generator (CPI-200K manufactured by San-Apro Ltd.) in 70 parts by weight of a solvent (cyclohexanone manufactured by Wako Pure Chemical Industries, Ltd.).

<Material for Formation of Cores>

A material for formation of cores was prepared by dissolving 100 parts by weight of an epoxy resin (YDCN-700-10 manufactured by Tohto Kasei Company Ltd.) and 2 parts by weight of the photoacid generator (CPI-200K manufactured by San-Apro Ltd.) in 60 parts by weight of a solvent (ethyl lactate).

<Manufacture of Optical Waveguide for Touch Panel>

The material for the formation of the above-mentioned under cladding layer was applied to the surface of a polyethylene naphthalate (PEN) film (100 mm×100 mm×188 μm (thickness)) by a spin coating method. After that, exposure by the use of irradiation with ultraviolet light at 2,000 mJ/cm$^2$ was performed. Subsequently, a heating treatment was performed at 100° C. for 15 minutes to form the under cladding layer. The thickness of this under cladding layer was 15 μm when measured with a contact-type film thickness meter. The refractive index of this under cladding layer at a wavelength of 850 nm was 1.51.

Next, the material for the formation of the above-mentioned cores was applied to the surface of the above-mentioned under cladding layer by a spin coating method. After that, a drying process was performed at 150° C. for 2 minutes. Next, in order to manufacture simulated cores formed of only the lens portions, a synthetic quartz chrome mask (exposure mask) having an opening pattern formed therein which was identical in shape therewith was placed over the resulting core material. Then, exposure by the use of irradiation with ultraviolet light at 4,000 mJ/cm$^2$ was performed by a proximity exposure method from over the mask. After that, a heating treatment was performed at 120° C. for 5 minutes. Next, development was carried out using an aqueous solution of γ-butyrolactone to dissolve away an unexposed portion. After that, a heating treatment was performed at 120° C. for 5 minutes to form the cores.

Figure 8:
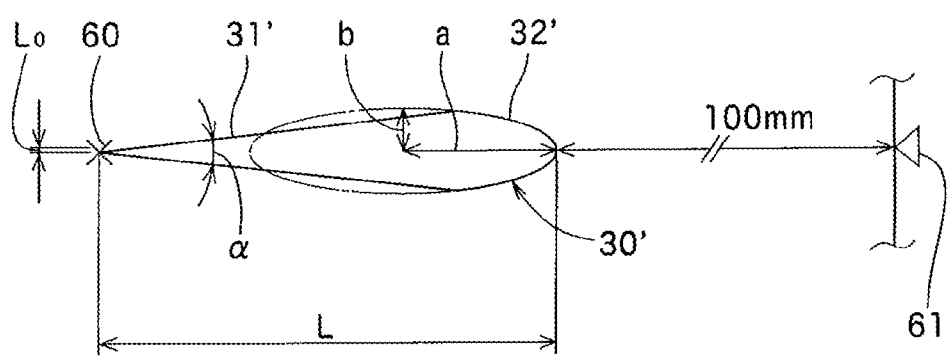
FIG. 8 is an explanatory view illustrating a method of measuring divergence of emitted light beams in Examples and Comparative Examples.

The dimensions of each of the cores (only the lens portion) (the longitudinal length (L) of a lens portion 30', the taper angle (α) of a tapered portion 31', and the major axis radius a and the minor axis radius b of an elliptical arc portion 32' of the end surface in FIG. 8) were set at values listed in Tables 1 to 5 below by the use of the above-mentioned chrome mask (exposure mask) having the opening patterns corresponding to the dimensions formed therein, respectively (Examples 1 to 16 and Comparative Examples 1 to 9). The above-mentioned respective dimensions were measured with a SEM (electron microscope). The thickness of the core was 50 μm, the width of a starting end 60 of the lens portion 30' ($L_0$ in FIG. 8) was 15 μm, and the refractive index at a wavelength of 850 nm was 1.57.

Next, the material for the formation of the above-mentioned over cladding layer was applied to the surface of the above-mentioned under cladding layer by a spin coating method so as to cover the above-mentioned cores. Then, exposure by the use of irradiation with ultraviolet light at 2,000 mJ/cm$^2$ was performed. Subsequently, a heating treatment was performed at 100° C. for 15 minutes to thereby form the over cladding layer. The thickness of the over cladding layer was 60 μm when measured with a contact-type film thickness meter. The refractive index of the over cladding layer at a wavelength of 850 nm was 1.51.

After that, the above-mentioned PEN film was removed from the under cladding layer. This provided an optical waveguide (simulated item).

<Evaluation of Divergence of Emitted Light Beams>

Light beams having a wavelength of 850 nm were caused to enter the starting end 60 of the lens portion 30' (see FIG. 8) of the core of each resultant optical waveguide (simulated item), and light beams were caused to be emitted from the tip of the elliptical arc portion 32' of the lens portion 30'. A photoreceiver 61 was placed 100 mm ahead of the tip of the end surface of the elliptical arc portion 32', and the width of the divergence of the received light beams was measured. The result was evaluated as follows. A width of the divergence which was 10 mm or less was evaluated as exhibiting satisfactory light-gathering performance (indicated by a circle), and a width of the divergence which was more than 10 mm was evaluated as exhibiting poor light-gathering performance (indicated by a cross). The results of the evaluation are indicated in Tables 1 to 5 below.

TABLE 1

| | | Examples | | | | | |
|---|---|---|---|---|---|---|---|
| | | 1 | 2 | 3 | 4 | 5 | 6 |
| Configuration of Lens Portion | Major Axis Radius a (mm) | 0.500 | 1.000 | 1.000 | 1.000 | 2.000 | 3.000 |
| | Minor Axis Radius b (mm) | 0.137 | 0.274 | 0.274 | 0.274 | 0.548 | 0.822 |
| | Lens Length L (mm) | 0.981 | 1.962 | 1.962 | 1.962 | 3.923 | 5.885 |
| | Taper Angle α (°) | 12 | 4 | 12 | 20 | 14 | 4 |
| | b/a | 0.27 | 0.27 | 0.27 | 0.27 | 0.27 | 0.27 |
| | L/a | 1.96 | 1.96 | 1.96 | 1.96 | 1.96 | 1.96 |

TABLE 1-continued

|  |  | Examples | | | | | |
|---|---|---|---|---|---|---|---|
|  |  | 1 | 2 | 3 | 4 | 5 | 6 |
| Evaluation | Width of Divergence of Light Beam (mm) | 7.0 | 6.0 | 3.0 | 8.8 | 1.4 | 3.3 |
|  | Conclusion | ○ | ○ | ○ | ○ | ○ | ○ |

TABLE 2

|  |  | Examples | | | | | |
|---|---|---|---|---|---|---|---|
|  |  | 7 | 8 | 9 | 10 | 11 | 12 |
| Configuration of Lens Portion | Major Axis Radius a (mm) | 3.000 | 3.000 | 5.000 | 0.800 | 0.800 | 0.800 |
|  | Minor Axis Radius b (mm) | 0.822 | 0.822 | 1.370 | 0.200 | 0.200 | 0.200 |
|  | Lens Length L (mm) | 5.885 | 5.885 | 9.809 | 1.300 | 1.300 | 1.300 |
|  | Taper Angle α (°) | 14 | 20 | 14 | 4 | 13 | 20 |
|  | b/a | 0.27 | 0.27 | 0.27 | 0.25 | 0.25 | 0.25 |
|  | L/a | 1.96 | 1.96 | 1.96 | 1.63 | 1.63 | 1.63 |
| Evaluation | Width of Divergence of Light Beam (mm) | 1.0 | 2.3 | 2.2 | 8.6 | 3.7 | 10.0 |
|  | Conclusion | ○ | ○ | ○ | ○ | ○ | ○ |

TABLE 3

|  |  | Examples | | | |
|---|---|---|---|---|---|
|  |  | 13 | 14 | 15 | 16 |
| Configuration of Lens Portion | Major Axis Radius a (mm) | 0.480 | 0.480 | 0.480 | 0.480 |
|  | Minor Axis Radius b (mm) | 0.160 | 0.160 | 0.240 | 0.240 |
|  | Lens Length L (mm) | 1.480 | 1.480 | 2.480 | 2.480 |
|  | Taper Angle α (°) | 4 | 8 | 4 | 8 |
|  | b/a | 0.33 | 0.33 | 0.50 | 0.50 |
|  | L/a | 3.08 | 3.08 | 5.17 | 5.17 |
| Evaluation | Width of Divergence of Light Beam (mm) | 8.4 | 8.8 | 5.8 | 3.7 |
|  | Conclusion | ○ | ○ | ○ | ○ |

TABLE 4

|  |  | Comparative Examples | | | | | |
|---|---|---|---|---|---|---|---|
|  |  | 1 | 2 | 3 | 4 | 5 | 6 |
| Configuration of Lens Portion | Major Axis Radius a (mm) | 0.500 | 1.000 | 0.800 | 0.800 | 0.800 | 0.480 |
|  | Minor Axis Radius b (mm) | 0.137 | 0.274 | 0.160 | 0.200 | 0.200 | 0.160 |
|  | Lens Length L (mm) | 0.981 | 1.962 | 1.300 | 1.300 | 1.300 | 1.480 |
|  | Taper Angle α (°) | 22 | 22 | 13 | 2 | 22 | 2 |
|  | b/a | 0.27 | 0.27 | 0.20 | 0.25 | 0.25 | 0.33 |
|  | L/a | 1.96 | 1.96 | 1.63 | 1.63 | 1.63 | 3.08 |
| Evaluation | Width of Divergence of Light Beam (mm) | 24.4 | 14.8 | 60.0 | 14.2 | 13.0 | 12.8 |
|  | Conclusion | x | x | x | x | x | x |

TABLE 5

|  |  | Comparative Examples | | |
|---|---|---|---|---|
|  |  | 7 | 8 | 9 |
| Configuration of Lens Portion | Major Axis Radius a (mm) | 0.480 | 0.480 | 0.480 |
|  | Minor Axis Radius b (mm) | 0.160 | 0.100 | 0.240 |
|  | Lens Length L (mm) | 1.480 | 2.480 | 2.480 |
|  | Taper Angle α (°) | 12 | 8 | 12 |
|  | b/a | 0.33 | 0.21 | 0.50 |
|  | L/a | 3.08 | 5.17 | 5.17 |
| Evaluation | Width of Divergence of Light Beam (mm) | 21.4 | 46.0 | 21.0 |
|  | Conclusion | x | x | x |

The foregoing results show that the optical waveguides (simulated items) of Examples 1 to 16 significantly suppress the divergence of the emitted light beams compared with the cases of Comparative Examples 1 to 9. Therefore, with an optical waveguide for a touch panel in which the above-mentioned configuration of the lens portion is applied to the end surface of the core, light beams may be transmitted with high efficiency between an optical waveguide on the light-emitting side and an optical waveguide on the light-receiving side, and the accuracy of finger detection in a touch panel may be greatly enhanced.

The optical waveguide for a touch panel and the touch panel using the same may be used for a touch panel which is required to have excellent position detection performance, a touch panel in which a stylus is used for input, and the like.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An optical waveguide for a touch panel, comprising: cores; and
an over cladding layer formed so as to cover the cores,
wherein the optical waveguide are provided along a periphery of a display screen of a display of the touch panel,
wherein the cores include light-emitting cores, each having an end portion positioned in a first side portion of the display screen of the display,
wherein each of the end portions of the light-emitting cores is formed as a lens portion,
wherein the lens portion has a shape in plan view including a tapered portion whose width gradually increases toward an end surface on the light-emitting side and an elliptical arc portion which is formed by bulging outwardly from a tip side of the tapered portion, so as to be in a shape of an elliptical arc,
wherein the elliptical arc portion has a major axis direction aligned in a longitudinal direction of the tapered portion,
wherein a longitudinal length (L) of the lens portion in μm, a taper angle (α) of the tapered portion in degrees, and a major axis radius (a) in am of an ellipse constituting part of the elliptical arc portion satisfy one of the following conditions (1) and (2):

$$\text{When } L/a < 3, 4° \leq \alpha \leq 20° \tag{1}$$

$$\text{When } L/a \geq 3, 4° \leq \alpha \leq 10° \tag{2}$$

2. The optical waveguide for a touch panel according to claim 1, wherein the longitudinal length (L) of the lens portion in μm, and the major axis radius (a) in μm, and a minor axis radius (b) in μm of the ellipse of the elliptical arc portion satisfy the following conditions (3) and (4) at the same time, and the taper angle (α) in degrees of the tapered portion satisfies the following condition (5):

$$\sqrt{1-\left(\frac{n_1}{n_2}\right)^2} = \frac{b}{a} \tag{3}$$

$$1 + \frac{n_1}{n_2} = \frac{L}{a} \tag{4}$$

$$4° \leq \alpha \leq 20° \tag{5}$$

wherein $n_1$ is a refractive index of the over cladding layer, and $n_2$ is a refractive index of the cores.

3. The optical waveguide for a touch panel according to claim 2,
wherein an end portion on the light-emitting side of the over cladding layer which covers the lens portion of each of the cores is formed as a second lens portion;
wherein an end surface on the light-emitting side of the second lens portion is formed as a substantially quadrantal curved surface in side view which bulges outwardly; and
wherein a distance ($L_2$) in μm between a tip of an elliptical arc curved surface in plan view of the elliptical arc portion of the lens portion of each of the cores and a center of curvature of the substantially quadrantal curved surface in side view of the second lens portion, and a radius of curvature ($R_2$) in μm of the substantially quadrantal curved surface in side view satisfy the following condition (6):

$$(L_2/2)-0.3 < R_2 < (L_2/2)+0.3. \tag{6}$$

4. A touch panel, comprising:
the optical waveguide for a touch panel according to claim 3,
wherein the optical waveguide is provided along the periphery of the display screen of the display of the touch panel;
wherein an end portion of each of the light-emitting cores is positioned in a first side portion of the display screen of the display; and
wherein an end portion of each of the cores which receive the emitted light beams is positioned in a second side portion of the display screen of the display.

5. A touch panel, comprising:
the optical waveguide for a touch panel according to claim 2,
wherein the optical waveguide is provided along the periphery of the display screen of the display of the touch panel;
wherein an end portion of each of the light-emitting cores is positioned in a first side portion of the display screen of the display; and
wherein an end portion of each of the cores which receive the emitted light beams is positioned in a second side portion of the display screen of the display.

6. The optical waveguide for a touch panel according to claim 1,
wherein an end portion on the light-emitting side of the over cladding layer which covers the lens portion of each of the cores is formed as a second lens portion;

wherein an end surface on the light-emitting side of the second lens portion is formed as a substantially quadrantal curved surface in side view which bulges outwardly; and wherein a distance ($L_2$) in μm between a tip of an elliptical arc curved surface in plan view of the elliptical arc portion of the lens portion of each of the cores and a center of curvature of the substantially quadrantal curved surface in side view of the second lens portion, and a radius of curvature ($R_2$) in μm of the substantially quadrantal curved surface in side view satisfy the following condition (6):

$$(L_2/2)-0.3<R_2<(L_2/2)+0.3. \tag{6}$$

7. A touch panel, comprising:

the optical waveguide for a touch panel according to claim 6, wherein the optical waveguide is provided along the periphery of the display screen of the display of the touch panel;

wherein an end portion of each of the light-emitting cores is positioned in a first side portion of the display screen of the display; and wherein an end portion of each of the cores which receive the emitted light beams is positioned in a second side portion of the display screen of the display.

8. A touch panel, comprising:

the optical waveguide for a touch panel according to claim 1, wherein the optical waveguide is provided along the periphery of the display screen of the display of the touch panel;

wherein an end portion of each of the light-emitting cores is positioned in a first side portion of the display screen of the display; and wherein an end portion of each of the cores which receive the emitted light beams is positioned in a second side portion of the display screen of the display.

\* \* \* \* \*

UNITED STATES PATENT AND TRADEMARK OFFICE
CERTIFICATE OF CORRECTION

| | | |
|---|---|---|
| PATENT NO. | : 8,442,366 B2 | Page 1 of 1 |
| APPLICATION NO. | : 13/337385 | |
| DATED | : May 14, 2013 | |
| INVENTOR(S) | : Naoki Shibata | |

It is certified that error appears in the above-identified patent and that said Letters Patent is hereby corrected as shown below:

In the Claims:

Claim 1, line 20-21, Column 15:
Change

"and a major axis radius (a) in am of an ellipse constituting part"

To be

-- and a major axis radius (a) in μm of an ellipse constituting part --

Signed and Sealed this
Twentieth Day of August, 2013

Teresa Stanek Rea
*Acting Director of the United States Patent and Trademark Office*